US008720013B2

(12) United States Patent
Chen

(10) Patent No.: US 8,720,013 B2
(45) Date of Patent: May 13, 2014

(54) TRIGGER GRIP

(75) Inventor: Chi-Yuan Chen, Taipei (TW)

(73) Assignees: Yasuharu Nagaki, Osaka (JP); James Ke Liu, Ontario, CA (US)

( * ) Notice: Subject to any disclaimer, the term of this patent is extended or adjusted under 35 U.S.C. 154(b) by 308 days.

(21) Appl. No.: 13/137,894

(22) Filed: Sep. 21, 2011

(65) Prior Publication Data

US 2012/0005863 A1 Jan. 12, 2012

(51) Int. Cl.
*F16G 11/04* (2006.01)
*F16B 2/10* (2006.01)

(52) U.S. Cl.
USPC .......... 24/132 R

(58) Field of Classification Search
USPC .......... 24/132 R, 132 WL, 134 L, 134 N
See application file for complete search history.

(56) References Cited

U.S. PATENT DOCUMENTS

| | | | | |
|---|---|---|---|---|
| 1,942,625 A * | 1/1934 | Whalan et al. | 24/132 R |
| 2,330,736 A * | 9/1943 | Paulson | 24/132 R |
| 2,431,819 A * | 12/1947 | Meyer | 24/132 R |
| 2,561,514 A * | 7/1951 | Houseman | 188/65.2 |
| 2,985,933 A * | 5/1961 | Peterson et al. | 24/132 R |
| 3,599,297 A * | 8/1971 | Sievers | 24/132 R |
| 3,923,333 A * | 12/1975 | Whaley | 294/104 |
| 4,181,194 A * | 1/1980 | Bassett et al. | 182/112 |
| 5,146,655 A * | 9/1992 | Gibbs | 24/134 R |
| 8,375,526 B2 * | 2/2013 | Everett | 24/132 R |
| 2012/0000037 A1 * | 1/2012 | Chen et al. | 24/134 N |
| 2012/0005864 A1 * | 1/2012 | Chen | 24/132 WL |
| 2012/0279020 A1 * | 11/2012 | Riedrich | 24/133 |

FOREIGN PATENT DOCUMENTS

| | | | | |
|---|---|---|---|---|
| JP | 10255547 A * | 9/1998 | H01B 1/04 |
| TW | 529214 | 4/2003 | |

* cited by examiner

*Primary Examiner* — Robert J Sandy
*Assistant Examiner* — Louis Mercado

(57) ABSTRACT

A trigger grip (100) includes a body (10) including an upper jaw (11) extending laterally, a pivot section (12) depending from one end of the upper jaw (11), and a sleeve section (13) depending from another end of the upper jaw (11), the sleeve section (13) having a slot (131) and an extension (132) depending from the slot (131); a pivotal link (20) pivotably secured to the pivot section (12); a lever (30) having a first hole (31) at one end, a second hole (32) at the other end, and a protuberance (33) depending from the other end, the lever (30) being inserted through the slot (131) with its first hole (31) pivotably secured to the pivotal link (20); and a bifurcated gripping seat (40) pivotably secured to the pivotal link (20) and having a jaw member (41) engaged with the upper jaw (11) from below in an inoperative position.

4 Claims, 13 Drawing Sheets

100

TRIGGER GRIP

BACKGROUND OF THE INVENTION

1. Field of the Invention

The invention relates to wire gripping tools and more particularly to a trigger grip.

2. Description of Related Art

Taiwan Utility Model Publication No. 529,214 entitled wire grip discloses a grip for installing wires. The grip comprises a body, a wedge, and a biasing member.

The body has a base, an installation member at one end of the base for installing insulators on a utility pole, and two opposing upper jaws at the other end of the base for covering the top of the wedge. Also, core of a wire may be inserted into either side of the upper jaws.

The wedge is provided on a wedge conductor surface of the body and is adapted to move thereon. Core of a wire may be inserted into a gripping section of the installation member. Next, the wire core is gripped by the gripping section.

The biasing member is a spring member for making the wedge as a spring biased member. The biasing member is secured by a screw driven into either side of the wedge. Thus, elastic force may be transported to the wedge. A projection is provided on an opening of the wedge. The projection may facilitate the wedge to move to the installation member.

However, the prior art wire grip suffers a number of drawbacks. For example, the screw for securing the wedge to the installation member tends to separation after a period time of use. Further, a user has to use both hands to pull the projection to open the jaws prior to wire installation. This is very inconvenient in use. Thus, the need for improvement still exists.

SUMMARY OF THE INVENTION

It is therefore one object of the invention to provide a trigger grip comprising a body comprising an upper jaw extending laterally, a pivot section depending from one end of the upper jaw, and a sleeve section depending from the other end of the upper jaw, the sleeve section including a slot and an extension depending from the slot; a pivotal link pivotably secured to the pivot section; a lever comprising a first hole at one end, a second hole at the other end, and a protuberance depending from the other end, the lever being inserted through the slot with its first hole pivotably secured to the pivotal link; and a gripping seat pivotably secured to the pivotal link and comprising a jaw member engaged with the upper jaw from below in an inoperative position.

The invention has the following advantages as compared with the prior art wire grip.

A user may insert finger into a hole of the prior art grip used with a wire tightening device, hoist, or wire stretching device for wire gripping. However, the user may wear an insulating glove on the hand. Thus, it is inconvenient or even very difficult of inserting the finger into the hole. To the contrary, the invention has an extension on the body served as a trigger and a protuberance on the lever served as a pistol grip. Thus, the user may use two fingers of one hand to easily operate the extension and the protuberance respectively and open two opposite jaws and close same in a wire gripping operation.

The invention can be operated by a single hand. Further, a torsion spring interconnecting a projection of the body and the pivotal link can effect an automatic returning of the pivotal link for a next operation.

The projection is integrally formed with the body and can be used as a replacement of typical rivet. Thus, it simplifies the assembly of the invention, increases the overall structural strength of the body, increases safety, and prolongs the useful life of the invention.

The pivot section comprises a stepped-diameter, cylindrical projection extending laterally, the projection including a base with the pivotal link engaged therewith, an externally threaded member having a diameter smaller than that of the base, and a shoulder at a joining portion of the externally threaded member and the base. Moreover, the lever has one holed end pivotably secured to the pivotal link so as to maintain a substantially balance in operation.

The above and other objects, features and advantages of the invention will become apparent from the following detailed description taken with the accompanying drawings.

DETAILED DESCRIPTION OF THE INVENTION

Figure 1:
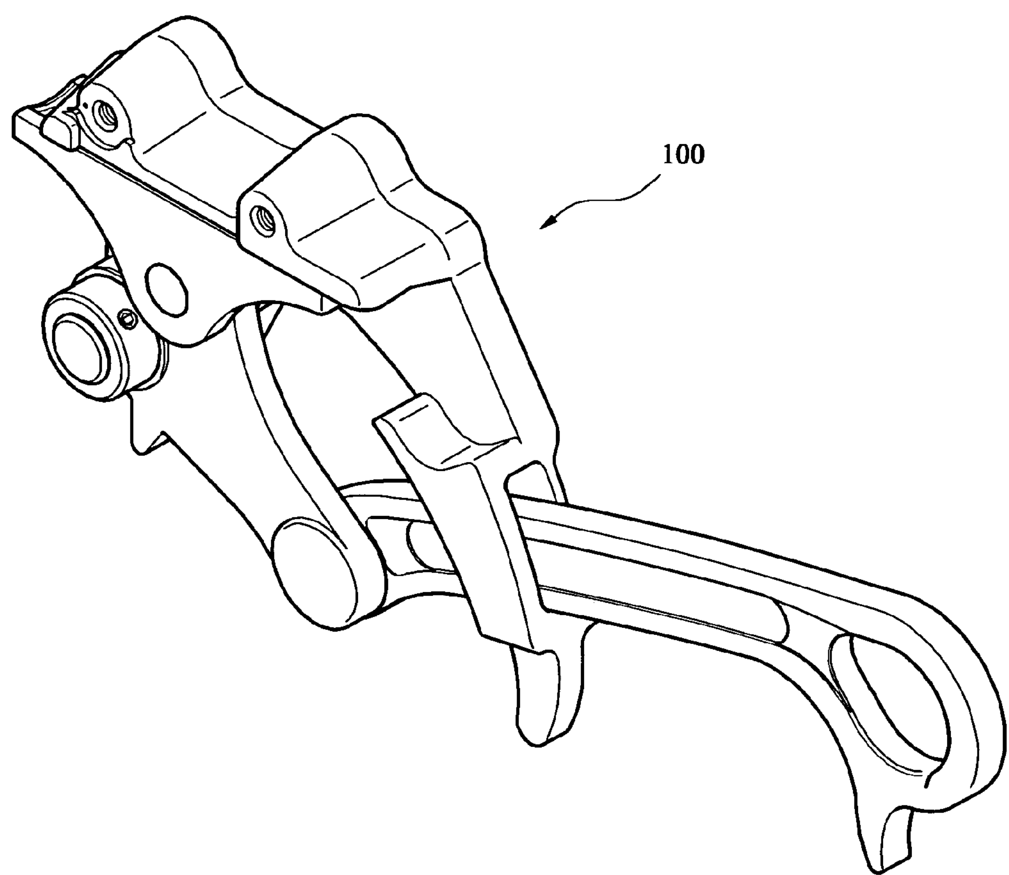
FIG. 1 is a perspective view of a trigger grip according to a first preferred embodiment of the invention, a pivotal plate not yet to assemble.
Figure 2:
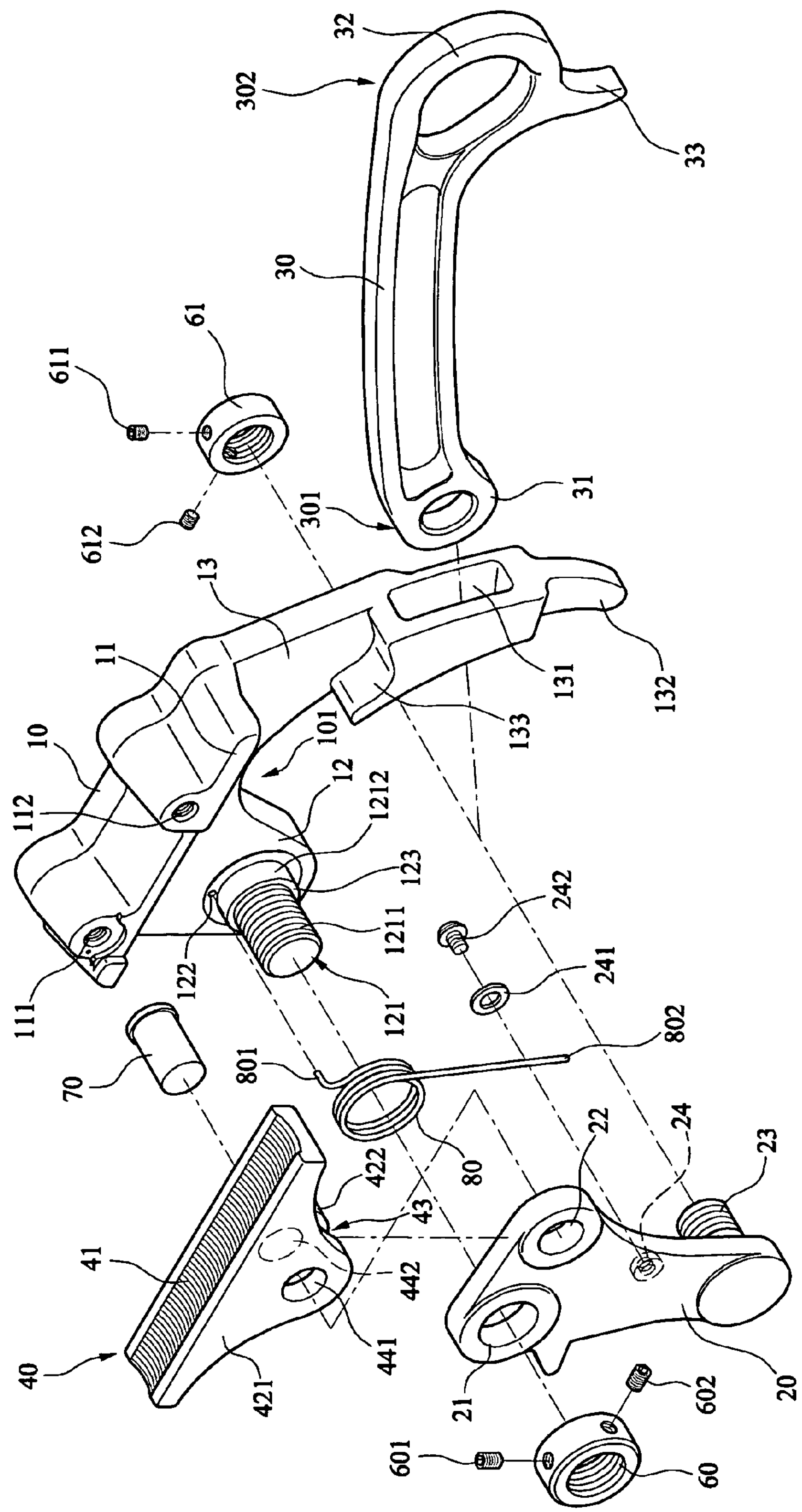
FIG. 2 is a perspective exploded view of FIG. 1.
Figure 3:
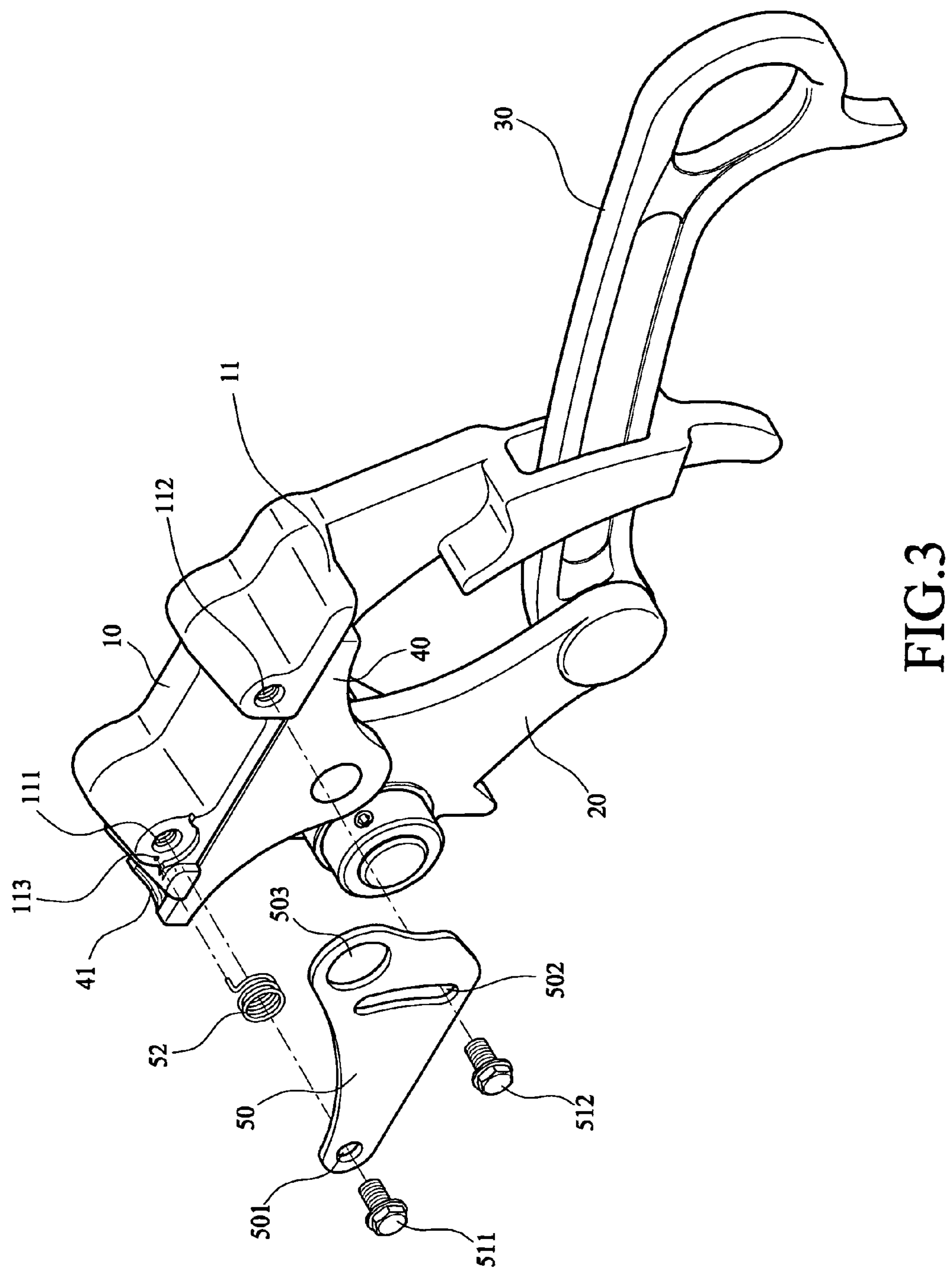
FIG. 3 is a perspective exploded view of FIG. 1 showing components of the pivotal plate to be assembled with the trigger grip.
Figure 4:
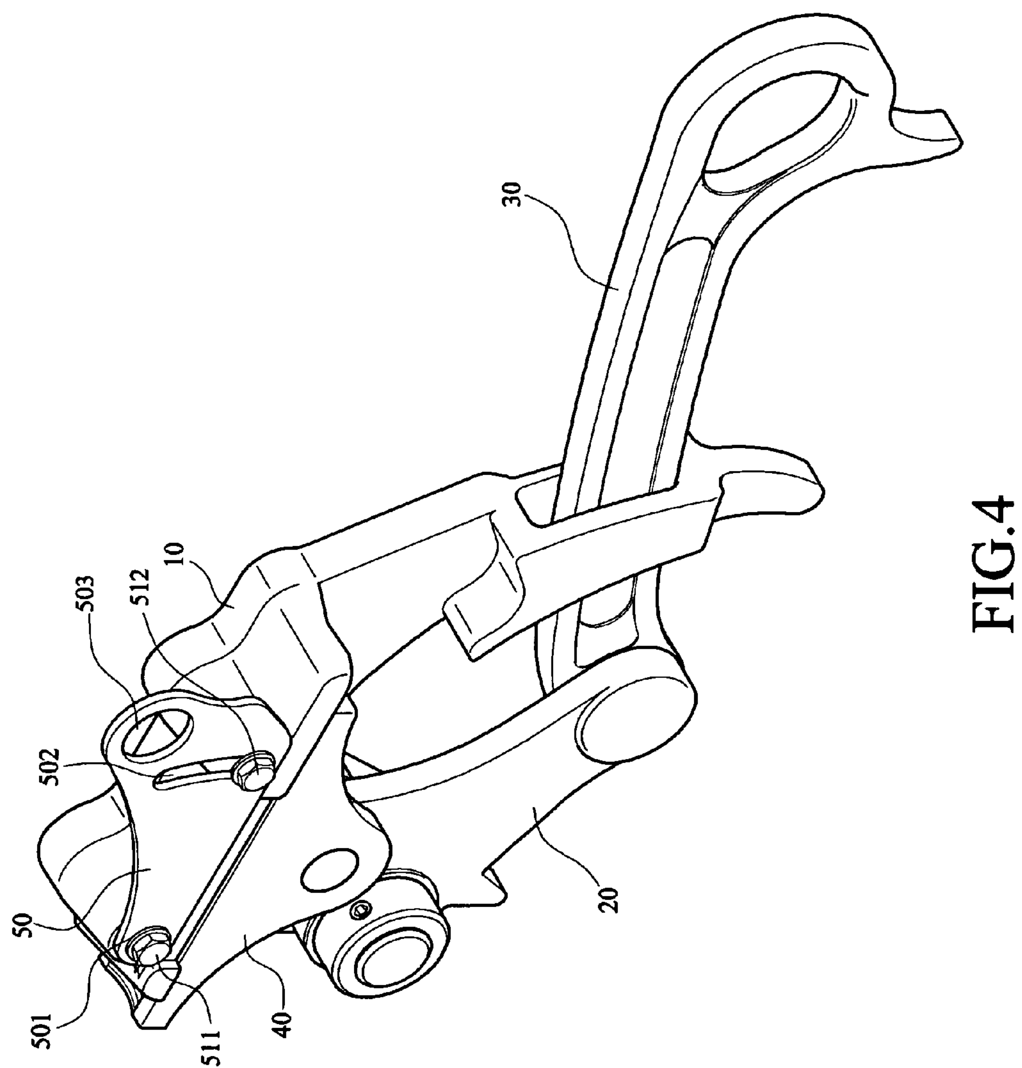
FIG. 4 is a perspective view of the assembled pivotal plate and the trigger grip shown in FIG. 3.
Figure 5:
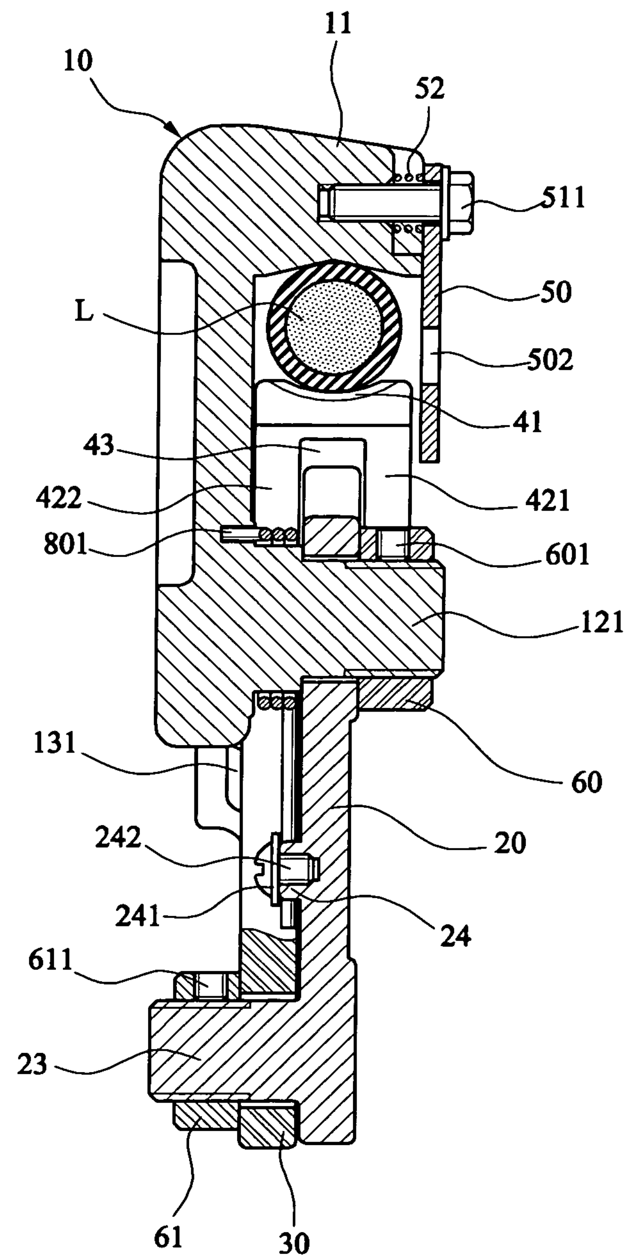
FIG. 5 is a longitudinal sectional view of FIG. 4.

Referring to FIGS. 1 to 9, a trigger grip 100 in accordance with a first preferred embodiment of the invention comprises a body 10, a pivotal link 20, a lever 30, a gripping seat 40 and a pivotal plate 50 each discussed in detail below.

The body 10 comprises a curved bottom recess 101, an upper jaw 11 extending laterally, and two spaced threaded holes 111, 112 on top of the upper jaw 11. The body 10 further comprises a pivot section 12 provided on one side of the recess 101 and a sleeve section 13 provided on the other side of the recess 101. The pivot section 12 comprises a solid, stepped-diameter, cylindrical projection 121 projecting laterally. A positioning hole 122 is provided on the pivot section 12 proximate an enlarged base 1212 of the projection 121. The projection 121 further comprises external threads 1211 and a shoulder 123 at a joining portion of the threads 1211 and the base 1212. The provision of the projection 121 can prevent the body 10 from being adversely deformed or even breaking when it is operated practically.

The substantially triangular pivotal plate 50 comprises a pivot hole 501 at a first corner, a curved slot 502 distal the pivot hole 501, and a hole member 503 at a second corner proximate the slot 502. A compression spring 52 has one end inserted into a position hole 113 proximate the threaded hole 111 for fastening. Screw 511 is driven through the pivot hole 501 and the compression spring 52 into the threaded hole 111 and screw 512 is driven through the slot 502 into the threaded hole 112 respectively. Thus, the pivotal plate 50 is a spring biased member. The pivotal plate 50 may be pivotably secured to the upper jaw 11 and is capable of pivoting about the threaded hole 111.

The sleeve section 13 comprises an intermediate slot 131 of rectangular cross-section, an extension 132 projecting downward from the slot 131, and an upper stop member 133 obliquely projecting upward from the slot 131 distal the extension 132.

The substantially triangular pivotal link 20 comprises a first hole 21 at a first corner, a second hole 22 at a second corner, an externally threaded protrusion 23 at a third corner projecting toward the body 10, and a threaded bossed hole 24 between the protrusion 23 and the second hole 22.

The lever 30 comprises one holed end 31, the other holed end (i.e., free end) 302, a first positioning hole 31 at one end, a second positioning hole 32 at the other end, and a downward extending protuberance 33 adjacent the second positioning hole 32. The protuberance 33 is curved so that the finger of a user may pull the protuberance 33 in operation.

The bifurcated gripping seat 40 comprises an elongated knurled jaw 41 on a top, two parallel plates 421, 422 depending downward from both sides of the jaw 41 respectively, a groove 43 defined between and by the parallel plates 421, 422, and two aligned through holes 441, 442 in the parallel plates 421, 422 respectively.

Further assembly of the invention will be described in detail below.

A torsion spring 80 is put on the projection 121 with one end 801 inserted into the positioning hole 122 for positioning.

The first hole 21 is put on the projection 121 to engage with the shoulder 123 and the other end 802 of the torsion spring 80 urges against an outer surface of the threaded bossed hole 24. A screw 242 is driven through a washer 241 into the threaded bossed hole 24 to fasten the other end 802 of the torsion spring 80. Next, a nut 60 is threadedly put on the threads 1211 to be retained. Finally, two threaded fasteners 601, 602 are driven through the nut 60 to pivotably secure the nut 60 to the projection 121.

The lever 30 is inserted through the slot 131 until one holed end 31 passes the slot 131. Next, one holed end 31 is put on the protrusion 23. Next, a nut 61 is threadedly put on external threads of the protrusion 23 to be retained. Finally, two threaded fasteners 611, 612 are driven through the nut 61 to pivotably secure the nut 61 to the protrusion 23. The pivotal link 20 is thus pivotably interconnected the body 10 and the lever 30.

The grove 43 of the gripping seat 40 is put on the second corner of the pivotal link 20 with the second hole 22 aligned with the through holes 441, 442. Finally, a pivot pin 70 is driven through one through hole 442, the second hole 22, and the other through hole 441 to pivotably fasten the pivotal link 20 and the gripping seat 40 together. As a result, the jaw 41 is engaged with the upper jaw 11 (see FIG. 4). Also, the jaw 41 is defined as a lower jaw 41.

An operation of the invention will be described in detailed below.

Figure 6:
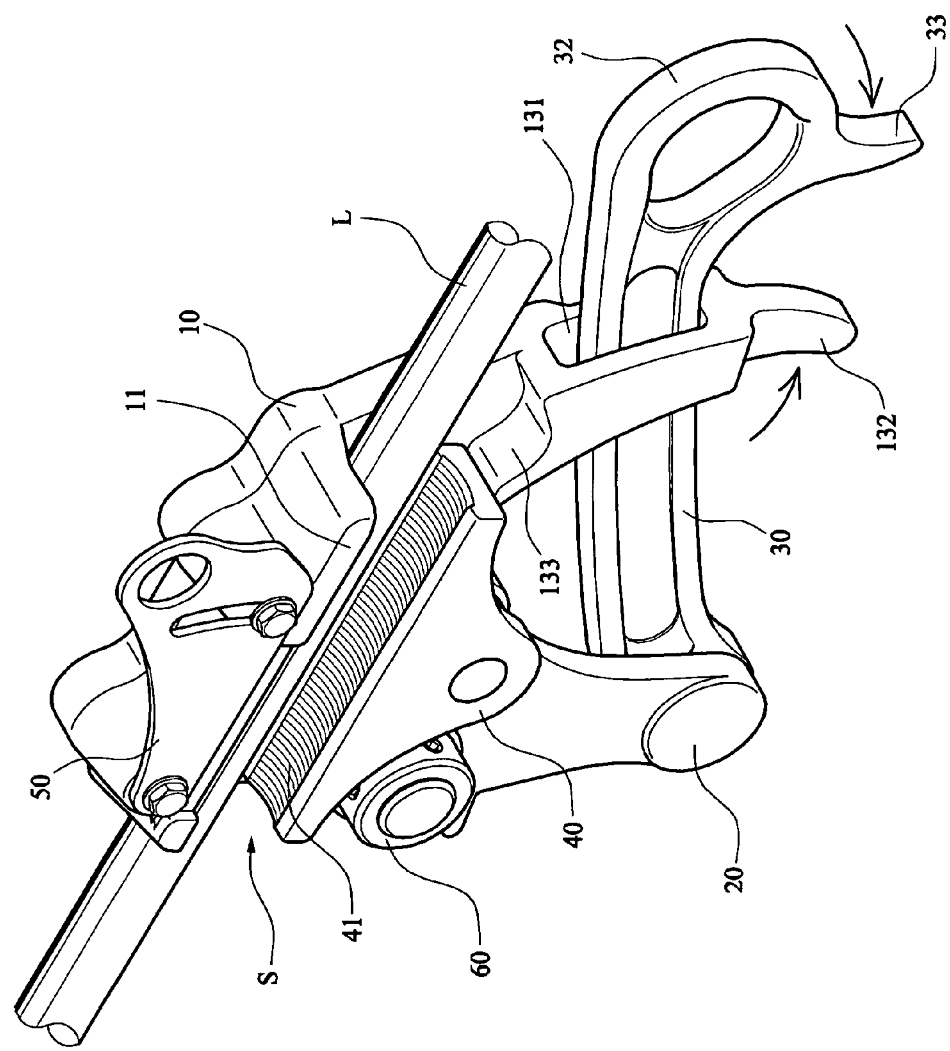
FIG. 6 is a view similar to FIG. 4 showing the trigger grip in use.
Figure 7:
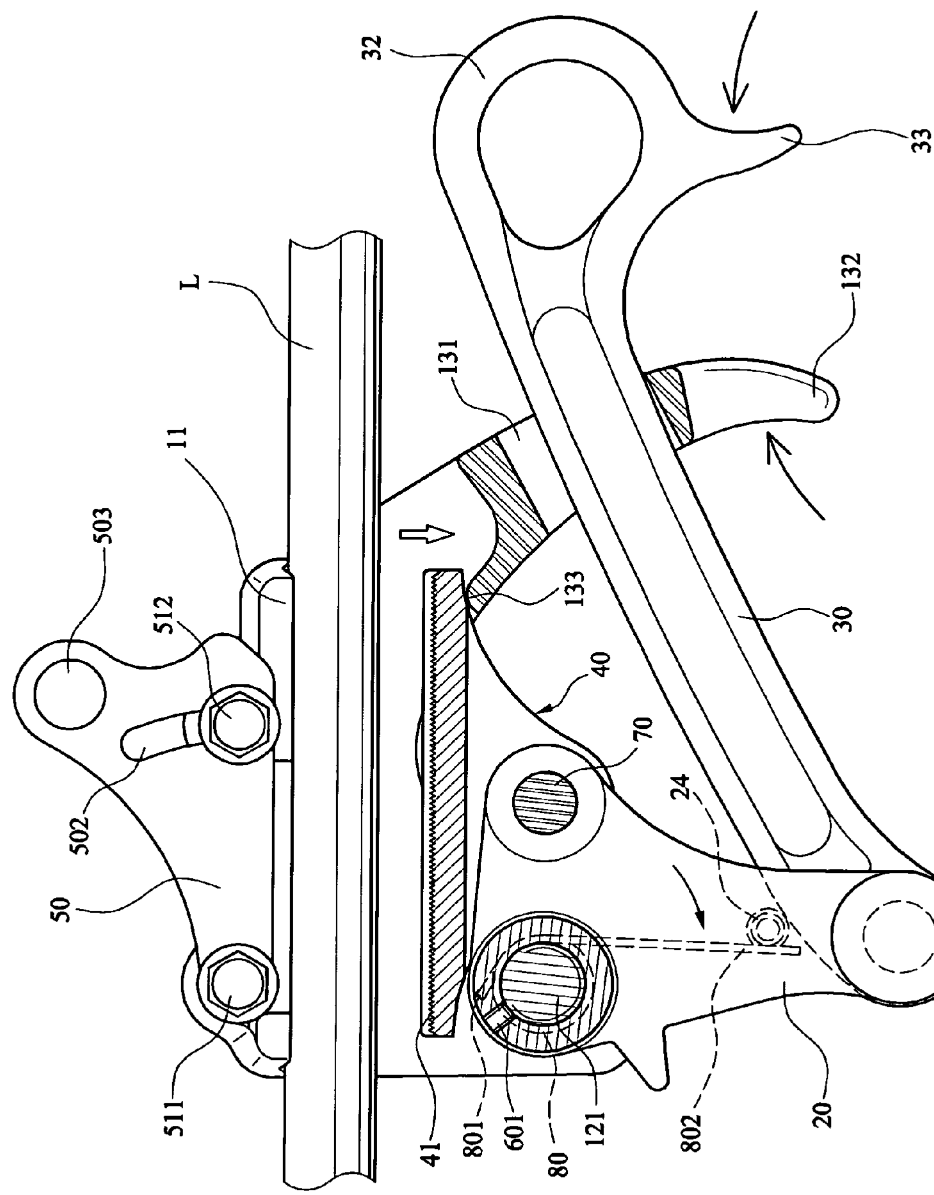
FIG. 7 is a side elevation in part section of FIG. 6.

As shown in FIGS. 6 and 7, a user may use one finger to hold the extension 132 (as a trigger) and another finger to hold the protuberance 33 (as a pistol grip) prior to pushing them toward each other as indicated by arrows. A distance between the extension 132 and the protuberance 33 is decreased and the lower jaw 41 moves downward due to the pivotal linking mechanism of the invention. A space S is thus formed between the upper jaw 11 and the lower jaw 41. The downward movement of the lower jaw 41 will be stopped when it contacts the upper stop member 133. Also, the torsion spring 80 is energized. Finally, insert a wire L through the space S.

Figure 8:
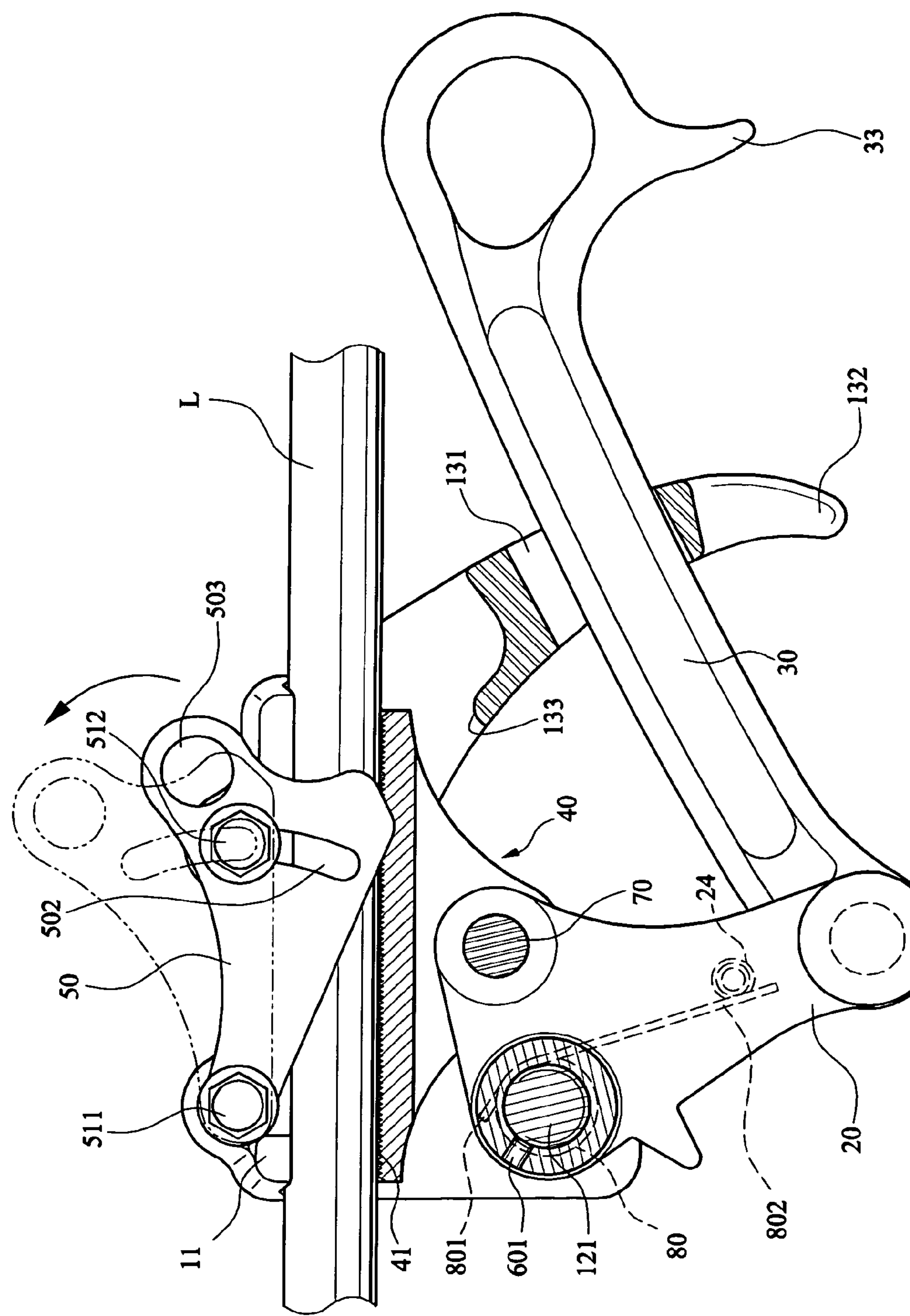
FIG. 8 is a view similar to FIG. 7 with the wire being gripped when the pivotal plate is in a first configuration.

As shown in FIG. 8, the hand of the user may release both the extension 132 and the protuberance 33. The stored elastic energy of the torsion spring 80 is automatically released to return the pivotal link 20 to its inoperative position. And in turn, the lower jaw 41 moves upward until it contacts the wire L. The wire L is thus fastened by both the upper jaw 11 and the lower jaw 41. One finger may insert into the hole member 503 and upward pivot the pivotal plate 50 about the threaded hole 111 (i.e., screw 511) with the screw 512 moving along the slot 502 as indicated by arrow. A portion of the pivotal plate 50 is thus disposed besides and engaged with the wire L for preventing the wire L from lateral dislodgement.

Figure 9:
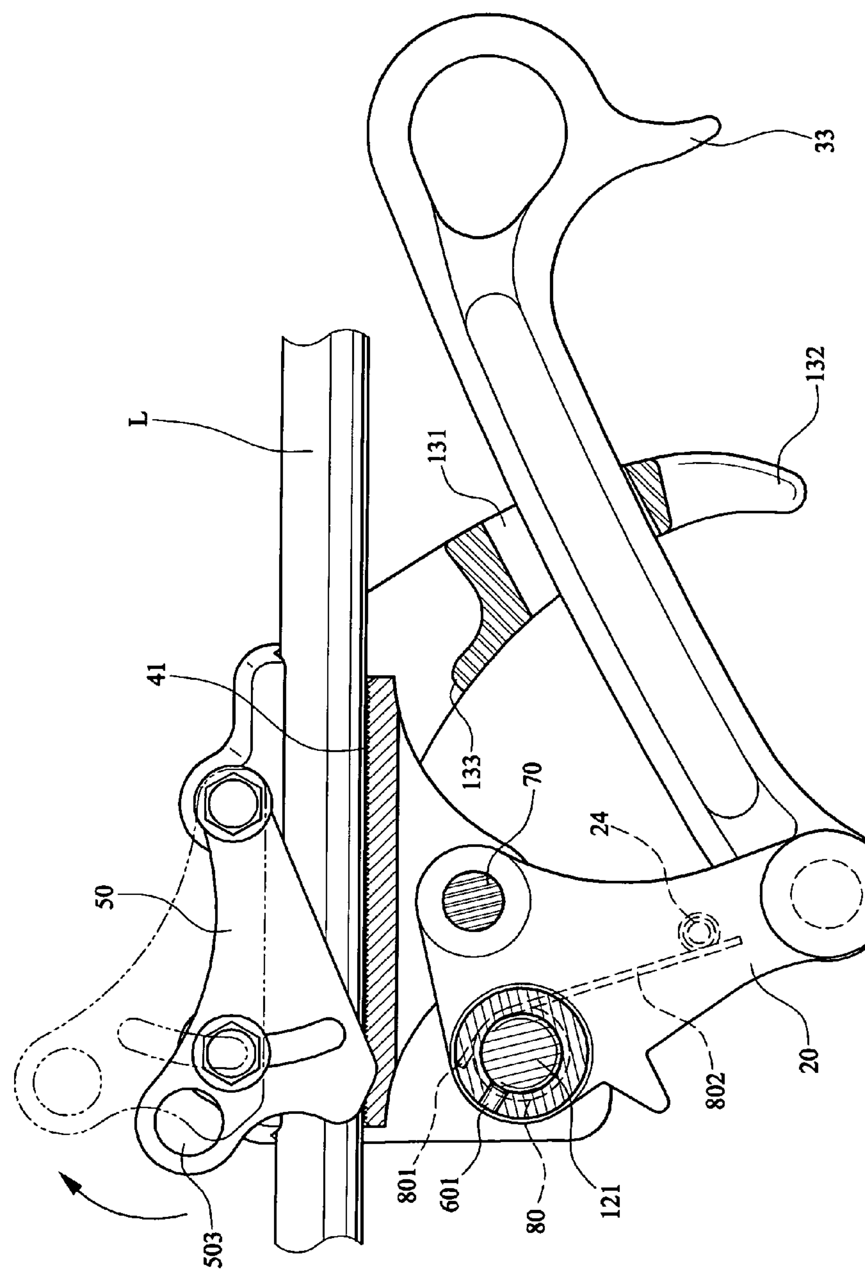
FIG. 9 is a view similar to FIG. 8 with the pivotal plate being in a second configuration.

As shown in FIG. 9, the pivotal plate 50 may be mounted on the body 1 in a second configuration opposite to that shown in FIG. 8. The same effect can be taken in the second configuration.

Figure 10:
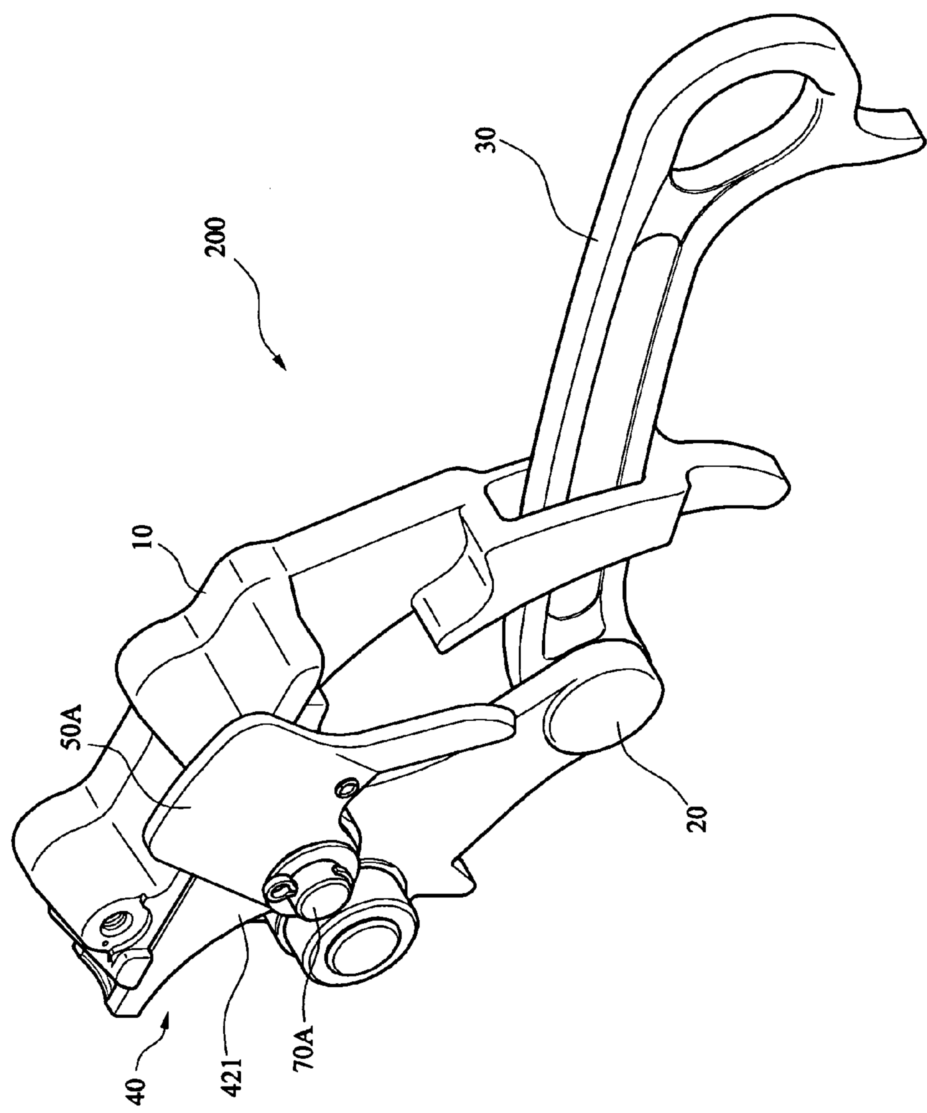
FIG. 10 is a perspective view of a trigger grip according to a second preferred embodiment of the invention.
Figure 11:
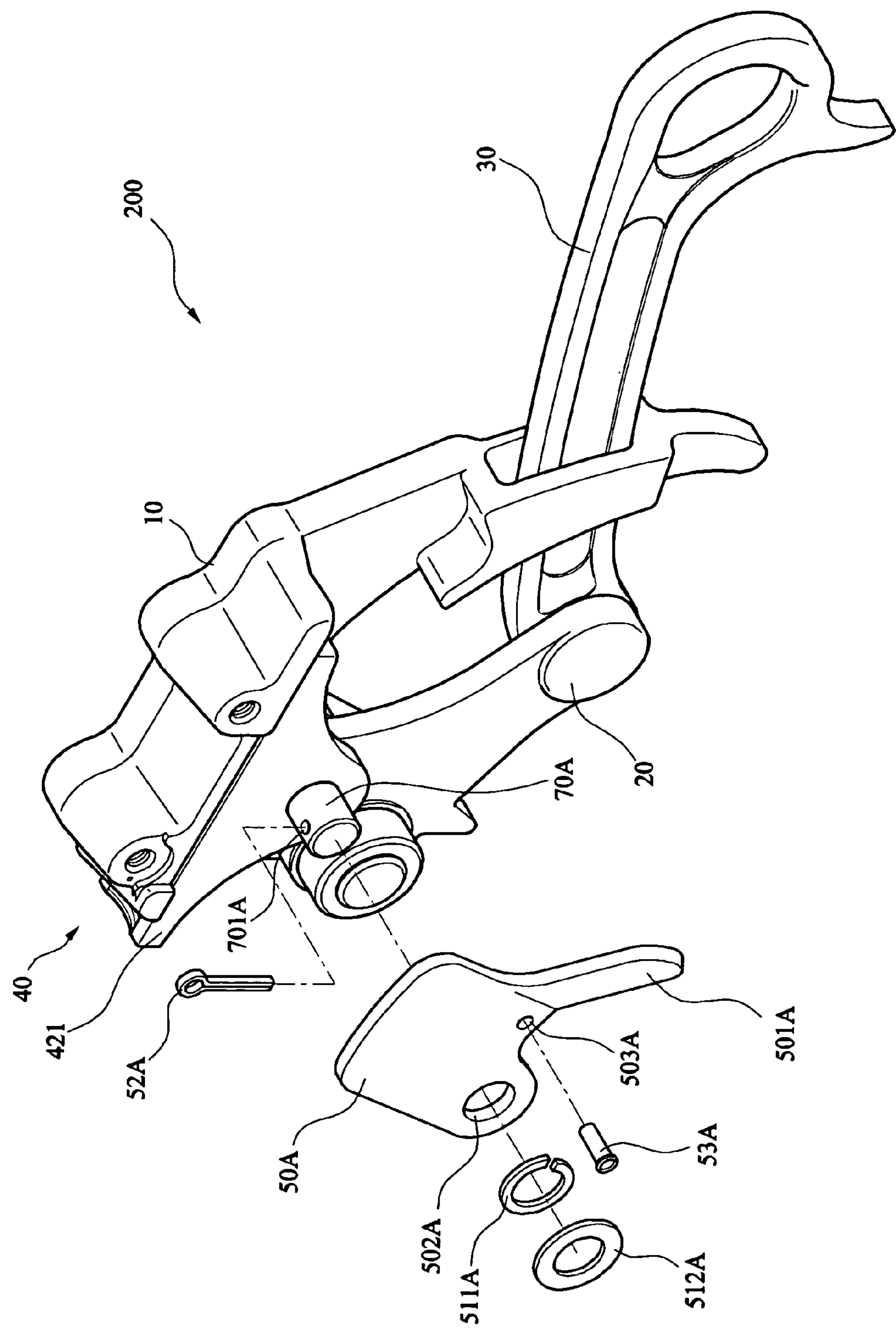
FIG. 11 is an exploded view of FIG. 10.
Figure 12:
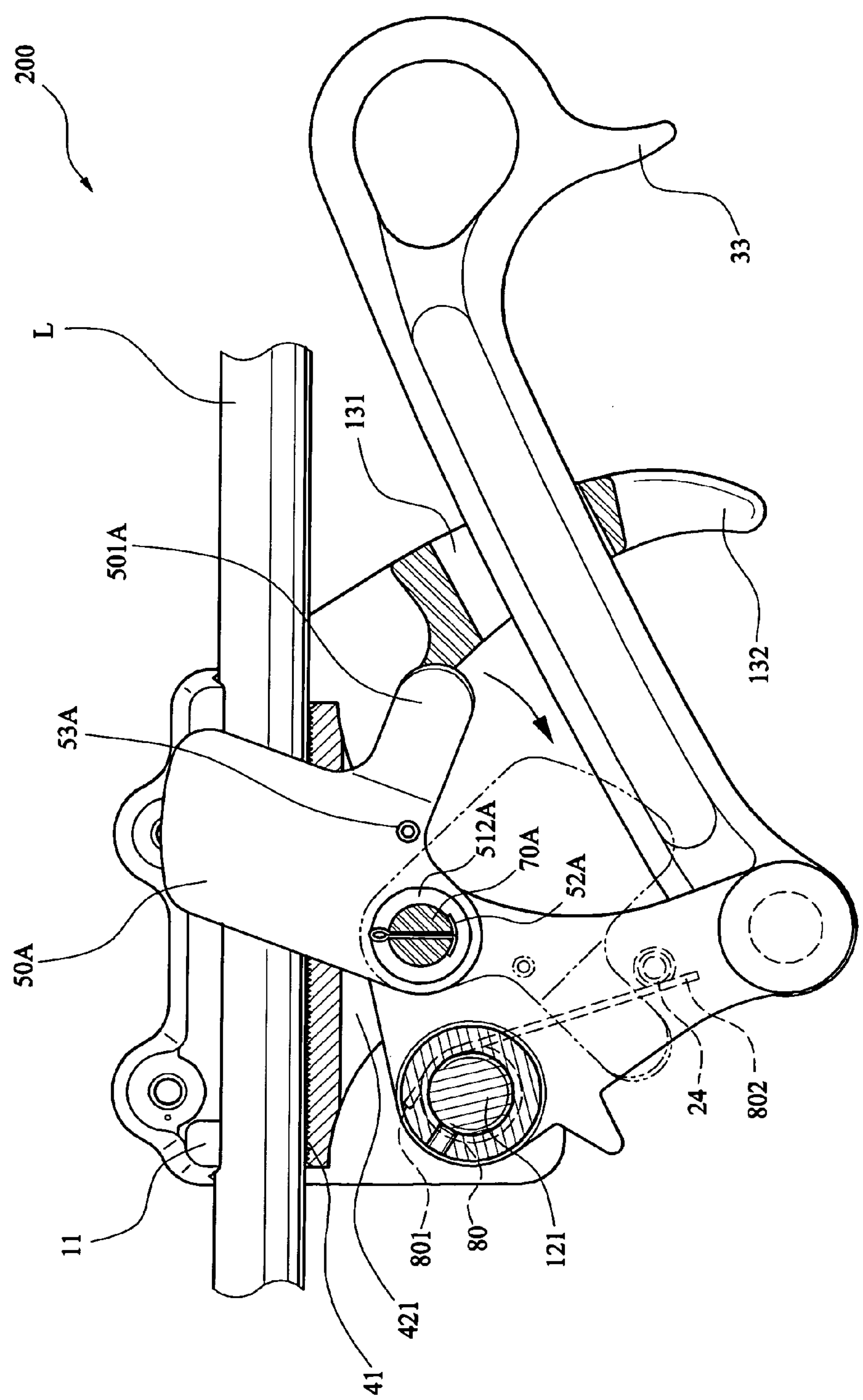
FIG. 12 is a side elevation in part section showing a wire being gripped by the trigger grip.

Referring to FIGS. 10 to 12, a trigger grip 200 in accordance with a second preferred embodiment of the invention is shown. The characteristics of the second preferred embodiment are substantially the same as that of the first preferred embodiment except the following:

A pivot pin 70A is further extended out of one side of the gripping seat 40 and a through hole 701A is provided through the pivot pin 70A.

A pivotal plate 50A comprises a projection 501A, a through hole 502A at a corner put on the pivot pin 70A, a C-ring 511A put on the pivot pin 70A and engaged with the through hole 502A, a washer 512A put on the pivot pin 70A and engaged with the C-ring 511A, a pin 52A inserted through the through hole 701A to pivotably retain the washer 512A, the C-ring 511A, and the pivotal plate 50A, a hole 503A between the projection 501A and the through hole 502A, and a stop pin 53A inserted through the hole 503A and extending out of the pivotal plate 50A a short distance. The provision of the stop pin 53A can limit a pivotal range of the pivotal plate 50A when the pivotal plate 50A is pivoted to protect one side of a wire fastened by the trigger grip 200.

Figure 13:
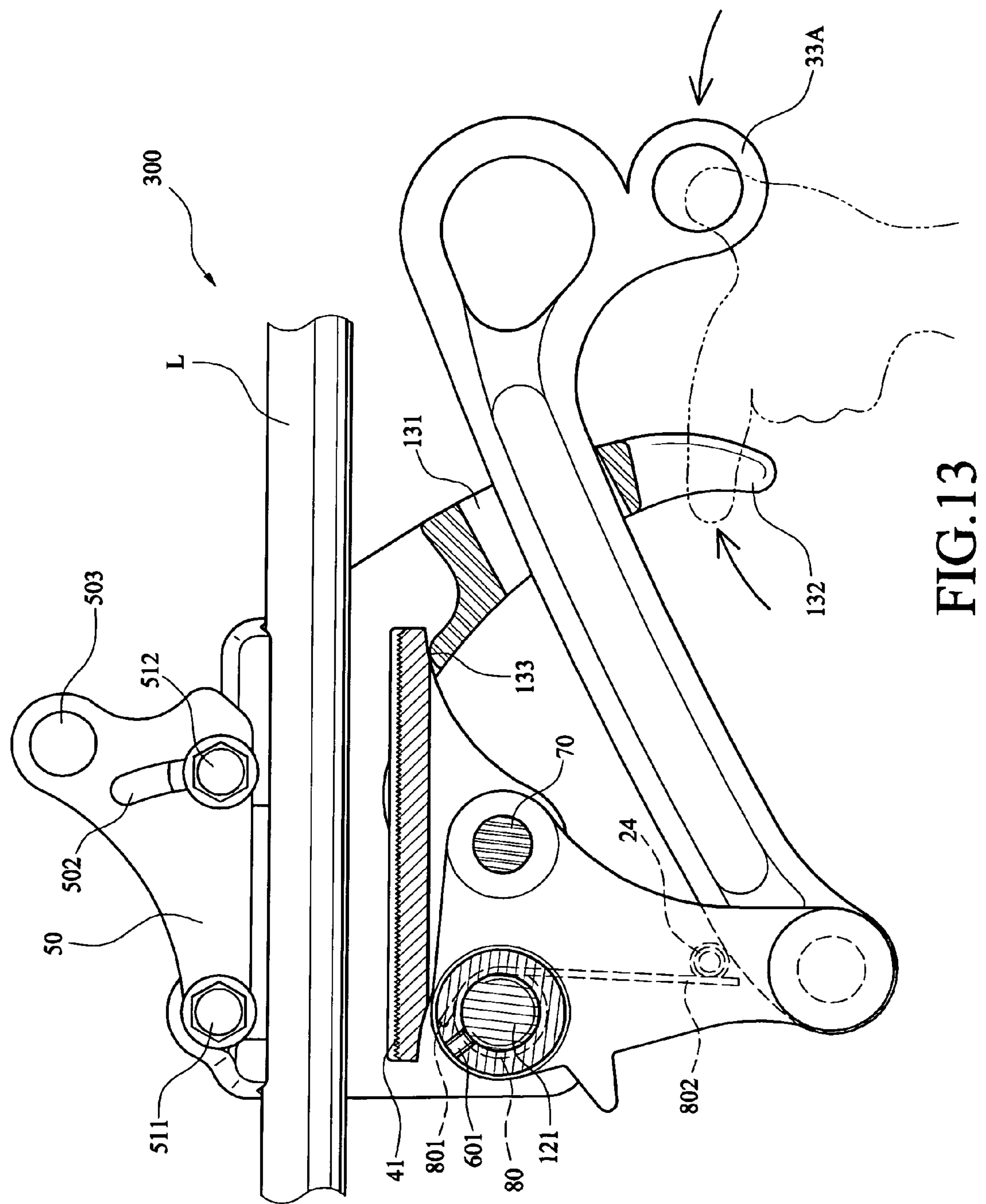
FIG. 13 is a side elevation in part section showing a wire being gripped by a trigger grip according to a third preferred embodiment of the invention.

Referring to FIG. 13, a trigger grip 300 in accordance with a third preferred embodiment of the invention is shown. The characteristics of the third preferred embodiment are substantially the same as that of the first preferred embodiment except the following:

The protuberance 33 of first preferred embodiment is shaped as a ring 33A which facilitates the gripping operation of the invention.

While the invention has been described in terms of preferred embodiments, those skilled in the art will recognize that the invention can be practiced with modifications within the spirit and scope of the appended claims.

What is claimed is:

1. A trigger grip comprising:

a body (10) comprising an upper jaw (11) extending laterally, a pivot section (12) depending from one end of the upper jaw (11), and a sleeve section (13) depending from another end of the upper jaw (11), the sleeve section (13) including a slot (131) and an extension (132) depending from the slot (131);

a pivotal link (20) pivotably secured to the pivot section (12);

a lever (30) comprising a first hole (31) at one end, a second-hole (32) at the other end, and a protuberance (33) depending from the other end, the lever (30) being inserted through the slot (131) with its first hole (31) pivotably secured to the pivotal link (20), the pivotal link (20) pivotably interconnected the pivot section (12) of the body (10) and the lever go) together by an externally threaded protrusion (23) of the pivotal link (20) pivotably securing to the first hole (31) of the lever (30); and a gripping seat (40) pivotably secured to the pivotal link (20) and comprising a jaw member (41) engaged with the upper jaw (11) from below in an inoperative position, wherein the pivot section (12) comprises a stepped-diameter, cylindrical projection (121) extending laterally, the projection (121) including a base (1212) with the pivotal link (20) engaged therewith, an externally threaded member (1211) having a diameter smaller than that of the base (1212), and a shoulder (123) at a joining portion of the externally threaded member (121) and the base (1212), and wherein the body (10) further comprises a positioning hole (122) proximate the base (1212) of the pivot section (12), and wherein the pivotal link (20) comprises a threaded bossed hole (24) facing the body, the trigger grip further comprising a biasing member (80) put on the projection (121), the biasing member (80) having one end (801) inserted into the positioning hole (122) for positioning, and another end (802) urging against an outer surface of the threaded bossed hole (24).

2. The trigger grip of claim 1, wherein the gripping seat (40) further comprises two parallel plates (421,422) depending downward from both sides of the jaw member (41) respectively, a groove (43) defined between and by the parallel plates (421,422), and two aligned through holes (441,442) in the parallel plates (421,422) respectively, and wherein the pivotal link (20) is further pivotably fastened in the groove (43) by mounting a pivot pin (70) through one through hole (422), the pivotal link (20), and the other through hole (441).

3. A trigger grip comprising:

a body (10) comprising an upper jaw (11) extending laterally, a pivot section (12) depending from one end of the upper jaw (11), and a sleeve section (13) depending from another end of the upper jaw (11), the pivot section (12) including a stepped-diameter, cylindrical projection (121) extending laterally, and the sleeve section (13) including a slot (131);

a pivotal link (20) pivotably secured to the pivot section (12);

a lever (30) comprising a first hole at one end (31), and a second hole (32) at the other end, the lever (30) being inserted through the slot (131) with its first hole (31) pivotably secured to the pivotal link (20), the pivotal link (20) pivotably interconnected the pivot section (12) of the body (10) and the lever (30) together by an externally threaded protrusion (23) of the pivotal link (20) pivotably securing to the first hole (31) of the lever (30); and a gripping seat (40) pivotably secured to the pivotal link (20) and comprising a jaw member (41) engaged with the upper jaw (11) from below in an inoperative position, wherein the projection (121) including a base (1212) with the pivotal link (20) engaged therewith, an externally threaded member (1211) having a diameter smaller than that of the base (1212), and a shoulder (123) at a joining portion of the externally threaded member (1211) and the base (1212), and wherein the body (10) further comprises a positioning hole (122) proximate the base (1212) of the pivot section (12), and wherein the pivotal link (20) comprises a threaded bossed hole (24) facing the body, the trigger-grip further comprising a biasing member (80) put on the projection (121), the biasing member (80) having one end (801) inserted into the positioning hole (122) for positioning, and another end (802) urging against an outer surface of the threaded bossed hole (24).

4. The trigger grip of claim 3, wherein the gripping seat (40) further comprises two parallel plates (421,422) depending downward from both sides of the jaw member (41) respectively, a groove (43) defined between and by the parallel plates (421,422), and two aligned through holes (441,442) in the parallel plates (421,422) respectively, and wherein the pivotal link (20) is further pivotably fastened in the groove (43) by mounting a pivot pin (70) through one through hole (422), the pivotal link (20), and the other through hole (441).

* * * * *